(12) United States Patent
Singh et al.

(10) Patent No.: US 8,095,914 B1
(45) Date of Patent: Jan. 10, 2012

(54) METHODS FOR INSTRUCTION TRACE DECOMPOSITION

(75) Inventors: Deshanand Singh, Mississauga (CA); Stephen D. Brown, Toronto (CA)

(73) Assignee: Altera Corporation, San Jose, CA (US)

( * ) Notice: Subject to any disclaimer, the term of this patent is extended or adjusted under 35 U.S.C. 154(b) by 1286 days.

(21) Appl. No.: 11/696,157

(22) Filed: Apr. 3, 2007

(51) Int. Cl.
G06F 9/44 (2006.01)
G06F 11/00 (2006.01)

(52) U.S. Cl. ........ 717/128; 717/124; 717/127; 714/38.1

(58) Field of Classification Search .......... 717/124–135; 714/37, 38
See application file for complete search history.

(56) References Cited

U.S. PATENT DOCUMENTS

| | | | |
|---|---|---|---|
| 6,145,123 A * | 11/2000 | Torrey et al. | 717/128 |
| 6,247,146 B1 * | 6/2001 | Wheatley et al. | 714/38 |
| 6,314,530 B1 * | 11/2001 | Mann | 714/38 |
| 6,490,719 B1 * | 12/2002 | Thomas | 717/107 |
| 6,564,374 B1 * | 5/2003 | Jaaskelainen, Jr. | 717/159 |
| 6,971,092 B1 * | 11/2005 | Chilimbi | 717/158 |
| 6,983,455 B2 * | 1/2006 | Kuzmin | 717/130 |
| 7,171,628 B1 * | 1/2007 | Perttunen | 715/853 |
| 7,210,127 B1 * | 4/2007 | Rangachari | 717/128 |
| 7,308,681 B2 * | 12/2007 | Ekanadham et al. | 717/128 |
| 7,496,902 B2 * | 2/2009 | Levine et al. | 717/128 |
| 7,600,221 B1 * | 10/2009 | Rangachari | 717/128 |
| 7,793,267 B2 * | 9/2010 | Davison et al. | 717/128 |
| 2003/0196193 A1 * | 10/2003 | Kuzmin | 717/130 |
| 2004/0225996 A1 * | 11/2004 | Venkatesan et al. | 717/100 |
| 2005/0091643 A1 * | 4/2005 | Ekanadham et al. | 717/128 |
| 2006/0212761 A1 * | 9/2006 | Levine et al. | 714/45 |
| 2008/0092123 A1 * | 4/2008 | Davison et al. | 717/128 |

OTHER PUBLICATIONS

Larus, James R., "Efficient Program Tracing," May 1993, IEEE, p. 52-61.*

* cited by examiner

*Primary Examiner* — Anna Deng
*Assistant Examiner* — Qing Chen
(74) *Attorney, Agent, or Firm* — Womble Carlyle Sandridge & Rice, LLP

(57) ABSTRACT

An instruction trace is segmented into a number of contiguous instruction segments, such that each boundary between adjacent instruction segments is defined by a branch instruction. A segment identifier is assigned to each instruction segment, such that each instruction segment having identical content is assigned a same segment identifier. Using the assigned segment identifiers, the instruction trace is translated into a sequence of segment identifiers. The sequence of segment identifiers is then iteratively consolidated into a prime form that does not include a repetition of a heterogeneous pair of consecutive segment identifiers. The prime form of the sequence of segment identifiers is then rendered in a graphical format.

16 Claims, 13 Drawing Sheets

```
int sum = 0;
for (i=0; i<100; i++) {
      write_to_port( WRITE_PORT,  data_storage_array[i] );
      int status = read_from_port( STATUS_PORT );
      if (status == 1) {
            sum = sum + read_from_port( READ_PORT );
      } else {
            /*
* Rewrite to the WRITE_PORT and read again
*/
            write_to_port( WRITE_PORT,  data_storage_array[i] );
            sum = sum + read_from_port( STATUS_PORT );
                                       _____/
      }                                        201
}
```

Fig. 2

```
Move r0 <-- 0          /* r0 will store the variable sum */
Move r1 <-- 0          /* r1 will store the variable i */
Start_For_Loop:
Compare r1, 100
Branch_If_Equal End_For_Loop /* r2 will store data_storage_array[i] */

Move r2 <-- data_storage_array(r1)
      Write_to_IO_Port WRITE_PORT, r2
      Read_from_IO_Port STATUS_PORT, r3 /* r3 will store status */
      Compare r3, 1
      Branch_If_Not_Equal else_condition
if_condition:
            Read_from_IO_Port READ_PORT, r4
            Add r3 <-- r3 + r4
            Branch end_if
else_condition:
            Write_to_IO_Port WRITE_PORT, r2
            Read_from_IO_Port STATUS_PORT, r4
            Add r3 <-- r3 + r4
End_if:

Add r1 <-- r1 + 1
      Branch Start_For_Loop

End_For_Loop:
```

Fig. 3

```
Move r0 <-- 0
Move r1 <-- 0
Compare r1, 100
Branch_If_Equal End_For_Loop
Move r2 <-- data_storage_array(r1)
Write_to_IO_Port WRITE_PORT, r2
Read_from_IO_Port STATUS_PORT, r3
Compare r3, 1
Branch_If_Not_Equal else_condition
Read_from_IO_Port READ_PORT, r4
Add r3 <-- r3 + r4
Branch end_if
Add r1 <-- r1 + 1
Branch Start_For_Loop
Compare r1, 100
Branch_If_Equal End_For_Loop
Move r2 <-- data_storage_array(r1)
Write_to_IO_Port WRITE_PORT, r2
Read_from_IO_Port STATUS_PORT, r3
Compare r3, 1
Branch_If_Not_Equal else_condition
Read_from_IO_Port READ_PORT, r4
Add r3 <-- r3 + r4
Branch end_if
Add r1 <-- r1 + 1
Branch Start_For_Loop
Compare r1, 100
Branch_If_Equal End_For_Loop
Move r2 <-- data_storage_array(r1)
Write_to_IO_Port WRITE_PORT, r2
Read_from_IO_Port STATUS_PORT, r3
Compare r3, 1
Branch_If_Not_Equal else_condition
Read_from_IO_Port READ_PORT, r4
Add r3 <-- r3 + r4
Branch end_if
Add r1 <-- r1 + 1
Branch Start_For_Loop
. . . . . . .
. . . . . . .
. . . . . . .
Compare r1, 100
Branch_If_Equal End_For_Loop
Move r2 <-- data_storage_array(r1)
Write_to_IO_Port WRITE_PORT, r2
Read_from_IO_Port STATUS_PORT, r3
Compare r3, 1
Branch_If_Not_Equal else_condition
Read_from_IO_Port READ_PORT, r4
Add r3 <-- r3 + r4
Branch end_if
Add r1 <-- r1 + 1
Branch Start_For_Loop
```

Fig. 4A

```
Move r0 <-- 0
Move r1 <-- 0
Compare r1, 100
Branch_If_Equal End_For_Loop
Move r2 <-- data_storage_array(r1)
Write_to_IO_Port WRITE_PORT, r2
Read_from_IO_Port STATUS_PORT, r3
Compare r3, 1
Branch_If_Not_Equal else_condition
Read_from_IO_Port READ_PORT, r4
Add r3 <-- r3 + r4
Branch end_if
Add r1 <-- r1 + 1
Branch Start_For_Loop
Compare r1, 100
Branch_If_Equal End_For_Loop
Move r2 <-- data_storage_array(r1)
Write_to_IO_Port WRITE_PORT, r2
Read_from_IO_Port STATUS_PORT, r3
Compare r3, 1
Branch_If_Not_Equal else_condition
Write_to_IO_Port WRITE_PORT, r2
Read_from_IO_Port STATUS_PORT, r4
Add r3 <-- r3 + r4
Add r1 <-- r1 + 1
Branch Start_For_Loop
Compare r1, 100
Branch_If_Equal End_For_Loop
Move r2 <-- data_storage_array(r1)
Write_to_IO_Port WRITE_PORT, r2
Read_from_IO_Port STATUS_PORT, r3
Compare r3, 1
Branch_If_Not_Equal else_condition
Read_from_IO_Port READ_PORT, r4
Add r3 <-- r3 + r4
Branch end_if
Add r1 <-- r1 + 1
Branch Start_For_Loop
. . . . . . .
. . . . . . .
. . . . . . .
Compare r1, 100
Branch_If_Equal End_For_Loop
Move r2 <-- data_storage_array(r1)
Write_to_IO_Port WRITE_PORT, r2
Read_from_IO_Port STATUS_PORT, r3
Compare r3, 1
Branch_If_Not_Equal else_condition
Read_from_IO_Port READ_PORT, r4
Add r3 <-- r3 + r4
Branch end_if
Add r1 <-- r1 + 1
Branch Start_For_Loop
```

Fig. 4B

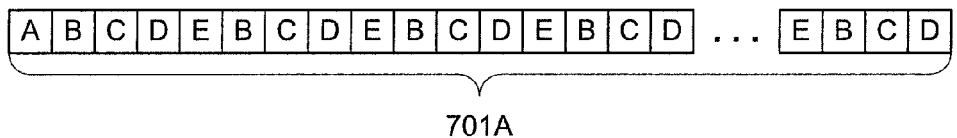
Fig. 7A
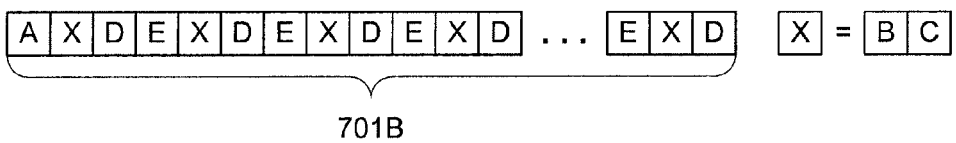
Fig. 7B
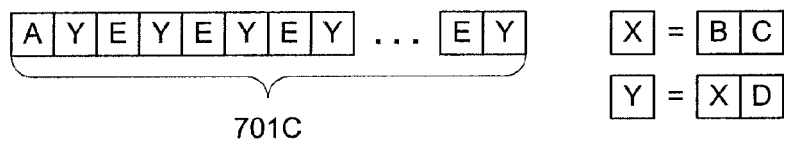
Fig. 7C
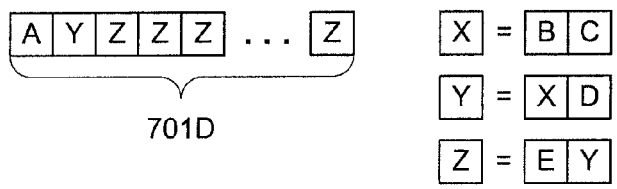
Fig. 7D
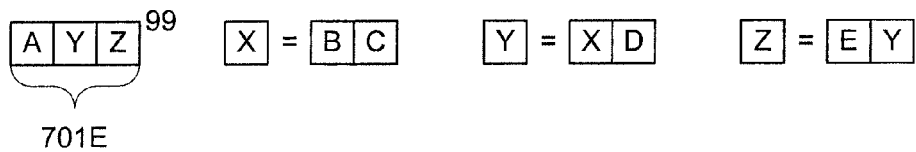
Fig. 7E
$$A(Y=(X=(BC)D))(EY)^{99}$$
Fig. 7F

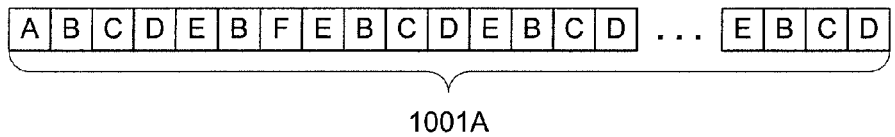
Fig. 10A
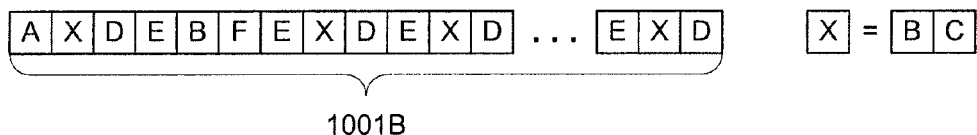
Fig. 10B
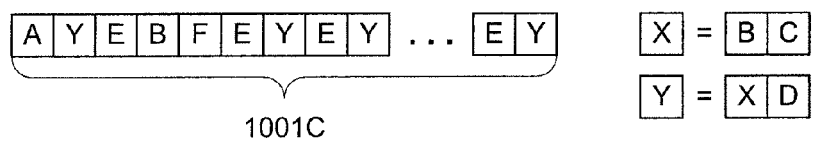
Fig. 10C
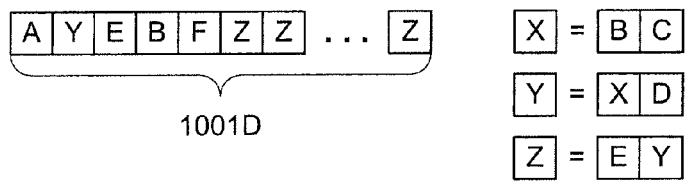
Fig. 10D
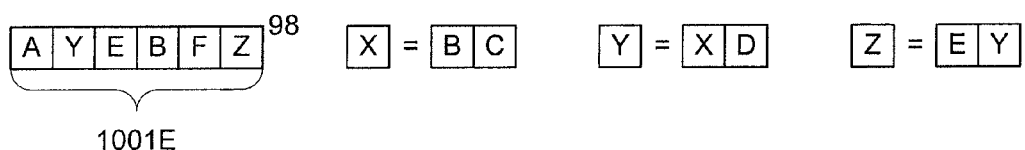
Fig. 10E
$A(Y=(X=(BC)D))EBF(EY)^{98}$
Fig. 10F

METHODS FOR INSTRUCTION TRACE DECOMPOSITION

BACKGROUND

A modern embedded system can include on-chip debug (OCD) hardware to assist in the debugging of software applications running on the embedded system. Considering that many bugs on embedded systems are intermittent and are caused by complex interactions between software and hardware peripherals, it should be appreciated that conventional line-by-line application source code debugging may never capture an intermittent hardware bug that only manifests itself when the application is running on the embedded system at real-time speed. The OCD hardware enables the software application running on the embedded system to be debugged in real-time. Additionally, the OCD hardware does not require modification of the software application to support debugging operations. The OCD hardware typically enables operations such as halting the processor, examining registers and memory, setting instruction breakpoints, setting data access watchpoints, and recording instruction traces.

An instruction trace is a record of all processor instructions executed on the embedded system within a given period of time with the application running on the embedded system at real-time speed. The OCD hardware module supports the recording of an instruction trace that captures all instructions that are performed between two breakpoints. Therefore, an instruction trace recorded with the OCD hardware module provides the software application developer with an exhaustive description of the processor instructions that are executed between two breakpoints. An instruction trace associated with an application running at real-time speed is likely to include an enormous number, e.g., thousands, of instructions. Consequently, although the instruction trace may include the particular information needed by the developer to diagnose a problem with the application, the enormous number of instructions listed in the instruction trace obscures the problem and can render the instruction trace essentially undecipherable by the developer.

In view of the foregoing, a solution is needed to facilitate understanding of an instruction trace recorded by OCD hardware for an application running in real-time on an embedded device.

SUMMARY

In one embodiment, a method is disclosed for decomposing an instruction trace. The method includes an operation for segmenting an instruction trace into a number of contiguous instruction segments, such that each boundary between adjacent instruction segments is defined by a branch instruction. An operation is then performed to assign a segment identifier to each instruction segment, such that each instruction segment having identical content is assigned a same segment identifier. The instruction trace is then translated into a sequence of segment identifiers. The method further includes an operation for iteratively consolidating the sequence of segment identifiers into a prime form. The prime form of the sequence of segment identifiers is then rendered in a graphical format.

In another embodiment, a method is disclosed for debugging an application executing on an embedded device. The method includes an operation for capturing a first instruction trace generated by the application at a first time. The first instruction trace extends between a first breakpoint and a second breakpoint. Also, the first instruction trace represents a correct performance of the application between the first and second breakpoints. The method also includes an operation for decomposing the first instruction trace to render the first instruction trace in a prime form defined by a consolidated sequence of instruction segment identifiers. In another operation, a second instruction trace generated by the application at a second time is captured. The second instruction trace extends between the first and second breakpoints. Also, the second instruction trace represents an incorrect performance of the application between the first and second breakpoints. The method further includes an operation for decomposing the second instruction trace to render the second instruction trace in a prime form defined by a consolidated sequence of instruction segment identifiers. A difference between the prime form of the first instruction trace and the prime form of the second instruction trace is then identified, wherein the difference is indicative of an error in the application. Additionally, an operation is performed to correct the error in the application.

In another embodiment, a computer readable storage medium having program instructions stored thereon for decomposing an instruction trace is disclosed. The program instructions for decomposing the instruction trace include program instructions for segmenting the instruction trace into a number of contiguous instruction segments, such that each boundary between adjacent instruction segments is defined by a branch instruction. Program instructions are also included for assigning a segment identifier to each instruction segment, such that each instruction segment having identical content is assigned a same segment identifier. Program instructions are also included for translating the instruction trace into a sequence of segment identifiers. Program instructions are further included for iteratively consolidating the sequence of segment identifiers into a prime form. The program instructions for decomposing the instruction trace further include program instructions for rendering the prime form of the sequence of segment identifiers in a graphical format.

Other aspects and advantages of the invention will become more apparent from the following detailed description, taken in conjunction with the accompanying drawings, illustrating by way of example the present invention.

BRIEF DESCRIPTION OF THE DRAWINGS

FIG. 2 is an illustration showing an example portion of application code to be used in describing a method for decomposing an instruction trace;

FIG. 3 is an illustration showing an assembly language translation of the example code of FIG. 2;

FIG. 4A is an illustration showing the instruction trace captured at a first execution instance of the example code of FIG. 2;

FIG. 4B is an illustration showing the instruction trace captured at a second execution instance of the example code of FIG. 2;

FIG. 7A is an illustration showing an original sequence of segment identifiers resulting from translation of the instruction trace of FIG. 4A;

FIG. 7B is an illustration showing a modified sequence of segment identifiers;

FIG. 7C is an illustration showing a modified sequence of segment identifiers;

FIG. 7D is an illustration showing a modified sequence of segment identifiers;

FIG. 7E is an illustration showing a modified sequence of segment identifiers;

FIG. 7F is an illustration showing the prime form of the original sequence of segment identifiers represented in a consolidated form;

FIG. 10A is an illustration showing an original sequence of segment identifiers resulting from translation of the instruction trace of FIG. 4B into a sequence of segment identifiers;

FIG. 10B is an illustration showing a modified sequence of segment identifiers;

FIG. 10C is an illustration showing a modified sequence of segment identifiers;

FIG. 10D is an illustration showing a modified sequence of segment identifiers;

FIG. 10E is an illustration showing a modified sequence of segment identifiers;

FIG. 10F is an illustration showing the prime form of the original sequence of segment identifiers represented in a consolidated form;

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

Figure 1:
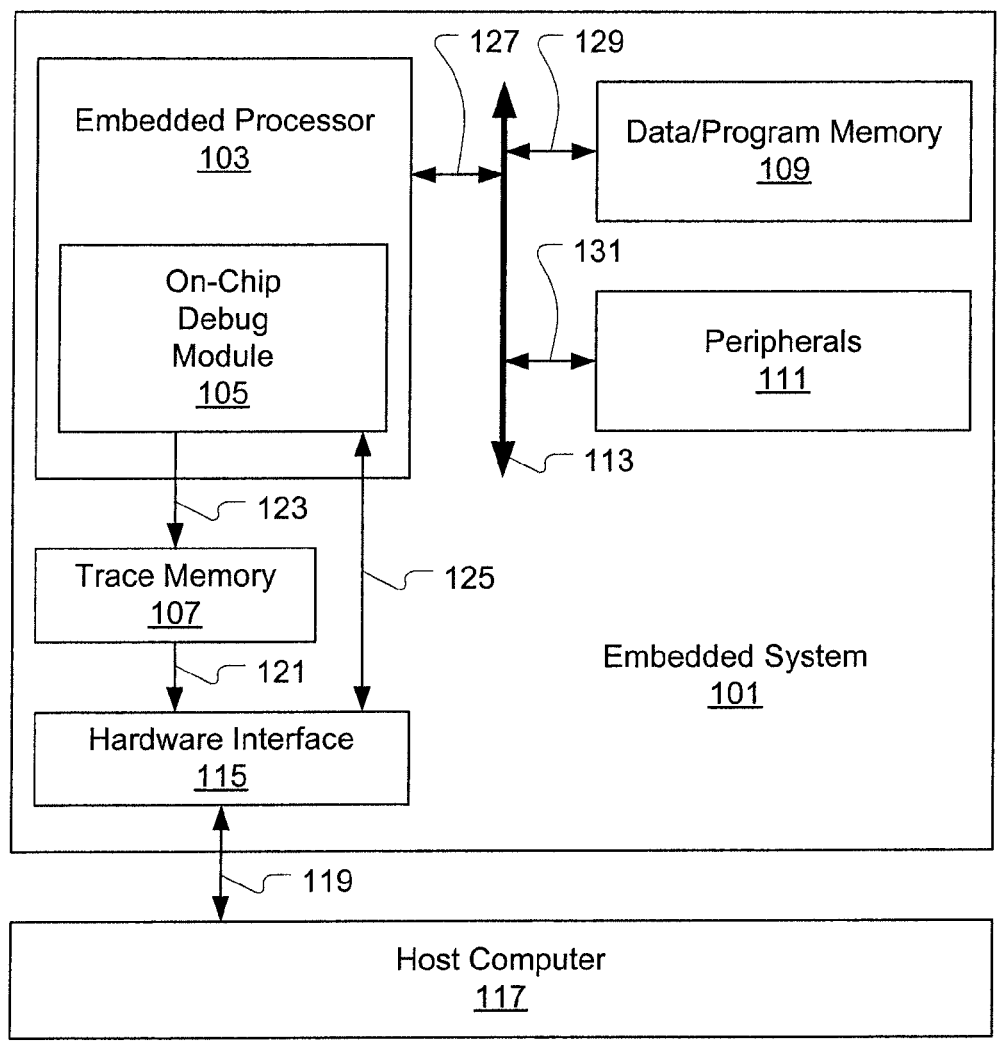
FIG. 1 is an illustration showing an architecture of an embedded system, in accordance with one embodiment of the present invention.

FIG. 1 is an illustration showing an architecture of an embedded system 101, in accordance with one embodiment of the present invention. It should be understood that embedded system 101 is intended to exemplify essentially any embedded system that is completely enclosed by the devices that they control. Examples of embedded systems include MP3 players, routers, PDAs, among many others. The embedded system 101 includes a hardware interface 115 through which the embedded system 101 can be connected to communicate in a bi-directional manner with a host computer 117, as indicated by arrow 119. In various embodiments, the hardware interface 115 is defined to support communication protocols such as JTAG, USB, RS232, or vendor-specific standards, among others. Development and debugging of a software application ("application" hereafter) is performed on the host computer 117, while the embedded system 101 serves as the platform that actually runs the application under development. The host computer 117 also provides a platform from which the application can be downloaded onto the embedded system.

The embedded system 101 includes an embedded processor 103 having on on-chip debug (OCD) module 105 defined therein. The OCD module 105 is defined to communicate in a bi-directional manner with the hardware interface 115, as indicated by arrow 125. Thus, the hardware interface 115 enables bi-directional communication between the OCD module 105 and the host computer 117. The OCD module 105 enables operations such as halting the embedded processor 103, examining registers and memory, setting instruction breakpoints, setting data access watchpoints, and recording instruction traces. The OCD module 105 is further defined to communicate with a trace memory 107, as indicated by arrow 107, for the purpose of recording instruction traces associated with an application executing on the embedded system 101 at real-time speed. The OCD module 105 is capable of capturing all processor instructions performed between two points in time, i.e., between two breakpoints. In one embodiment, the two breakpoints can be tied to specific events that occur during execution of the application on the embedded system 101. An instruction trace captured between two breakpoints can include a large number of instructions. In one embodiment, the OCD module 105 is defined to store the instruction traces in a compressed format to optimize utilization of the trace memory 107.

Although the embodiment of FIG. 1 shows the trace memory 107 included within the embedded system 101, it should be understood that the trace memory 107 can be defined external to the embedded system 101 in other embodiments. Instruction traces stored in the trace memory 107 can be communicated to the host computer 117 via the hardware interface 115, as indicated by arrows 121 and 119.

The embedded processor 103 is further defined to communicate in a bi-directional manner with a system bus 113, as indicated by arrow 127. Additionally, the embedded system 101 includes a data/program memory 109 connected to the system bus 113 so as to be accessible in a bi-directional manner, as indicated by arrow 129. The data/program memory 109 is provided for use by the embedded system 101 in performing its normal operations. The embedded system 101 further includes peripherals 111 connected to the system bus 113 as indicated by arrow 131. The peripherals 111 represent the hardware components to which the embedded processor 103 communicates during operation of the embedded system 101. For example, the peripherals 111 can include a display screen, input devices, LEDs, etc.

Application bugs within the embedded system 101 are generally specific to the architecture and functionality associated with the hardware of the embedded system 101. Also, application bugs within the embedded system 101 occur in a real-time manner and can be dependent upon the particular state of the embedded system 101. Thus, a given application bug may only manifest itself when the embedded system is operating in real-time and is in a particular state.

The host computer 117 is used to control the OCD module 105 to direct capture of an instruction trace between two specified breakpoints for an application executing on the embedded system 101 in real-time. The captured instruction trace is recorded in the trace memory 107. The instruction trace is copied from the trace memory 107 to the host computer 117. Once at the host computer 117, the instruction trace can be analyzed to determine and characterize any bugs, i.e., errors, that may be present therein. It should be appreciated that the instruction trace can include an enormous number, e.g., thousands, of lines of instructions. It is exceedingly tedious for a developer to understand the program flow when thousands of instructions are listed in the instruction trace. Additionally, because embedded system application bugs may be state dependent, it is often necessary to capture a number of instances of a give instruction trace at different states of the embedded system 101. Therefore, analysis of multiple instruction traces, each having an enormous number of lines, may be necessary for the application debugging effort. Consequently, to facilitate the application debugging effort, it is necessary to represent each instruction trace in a form that is understandable and manageable. To this end, a method for decomposing an instruction trace is disclosed herein.

FIG. 2 is an illustration showing an example portion of application code ("example code" hereafter) to be used in describing a method for decomposing an instruction trace. The example code is presented as C code. It should be appreciated that the example code shown in FIG. 2 and analyzed hereafter is in no way intended to limit the present invention. The example code defines a routine that executes a loop which writes data to an IO port name WRITE_PORT, checks a status code from the STATUS_PORT, and sums the values that it reads from the READ_PORT. The status code indicates whether or not the previous write operation was completed successfully. If the status code is "1," i.e., asserted, data can be read from the READ_PORT. Otherwise, if the status code is "0," i.e., not asserted, it is necessary to rewrite the data and re-perform the read operation. The example code has a small bug in that the sum is calculated by reading from the STATUS_PORT instead of the READ_PORT when the status code is not equal to "1." This bug is identified by reference numeral 201 in FIG. 2.

FIG. 3 is an illustration showing an assembly language translation of the example code of FIG. 2. The low-level instructions within the assembly language translation are not specific to a particular architecture. However, the types of low-level instructions within the assembly language translation and their variants are typically available on embedded processors. Therefore, the sequence of low-level instructions depicted in the assembly language translation of FIG. 3 represents the instructions that would be executed on an embedded system to implement the example code of FIG. 2.

For discussion purposes, suppose that a developer notices problem where the sum of values read from the READ_PORT in the example code of FIG. 2 is being computed incorrectly on some rare occasions, and the developer cannot immediately see the flaw in the example code. To facilitate the debugging effort, the developer decides to run an instruction trace between two breakpoints set at the beginning and end, respectively, of the example code. FIG. 4A is an illustration showing the instruction trace captured at a first execution instance of the example code in which the sum of values read from the READ_PORT is calculated correctly. FIG. 4B is an illustration showing the instruction trace captured at a second execution instance of the example code in which the sum of values read from the READ_PORT is calculated incorrectly. It should be appreciated that even for this simple example and a small instruction trace, it is difficult to immediately understand the differences between the two instruction traces represented in FIGS. 4A and 4B.

Figure 5A:
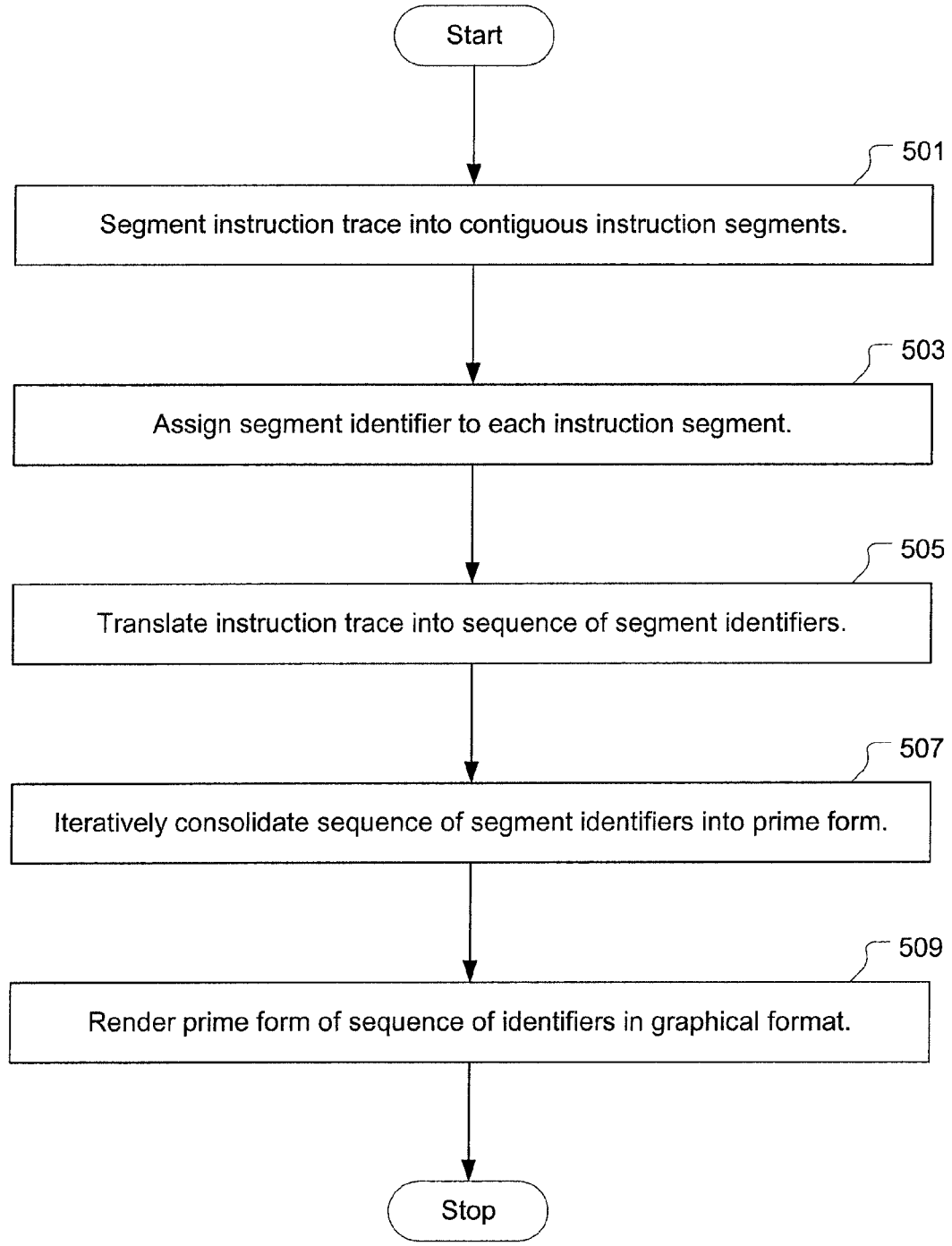
FIG. 5A is an illustration showing a flowchart of a method for decomposing an instruction trace, in accordance with one embodiment of the present invention.

FIG. 5A is an illustration showing a flowchart of a method for decomposing an instruction trace, in accordance with one embodiment of the present invention. The method includes an operation 501 in which the instruction trace is segmented into a number of contiguous instruction segments such that each boundary between adjacent instruction segments is defined by a branch instruction. It should be appreciated that blocks of code are logically divided at branch instructions. The branch instructions are used for control flow operations such as function calls, conditional statements, and loops, among others.

Figure 6:
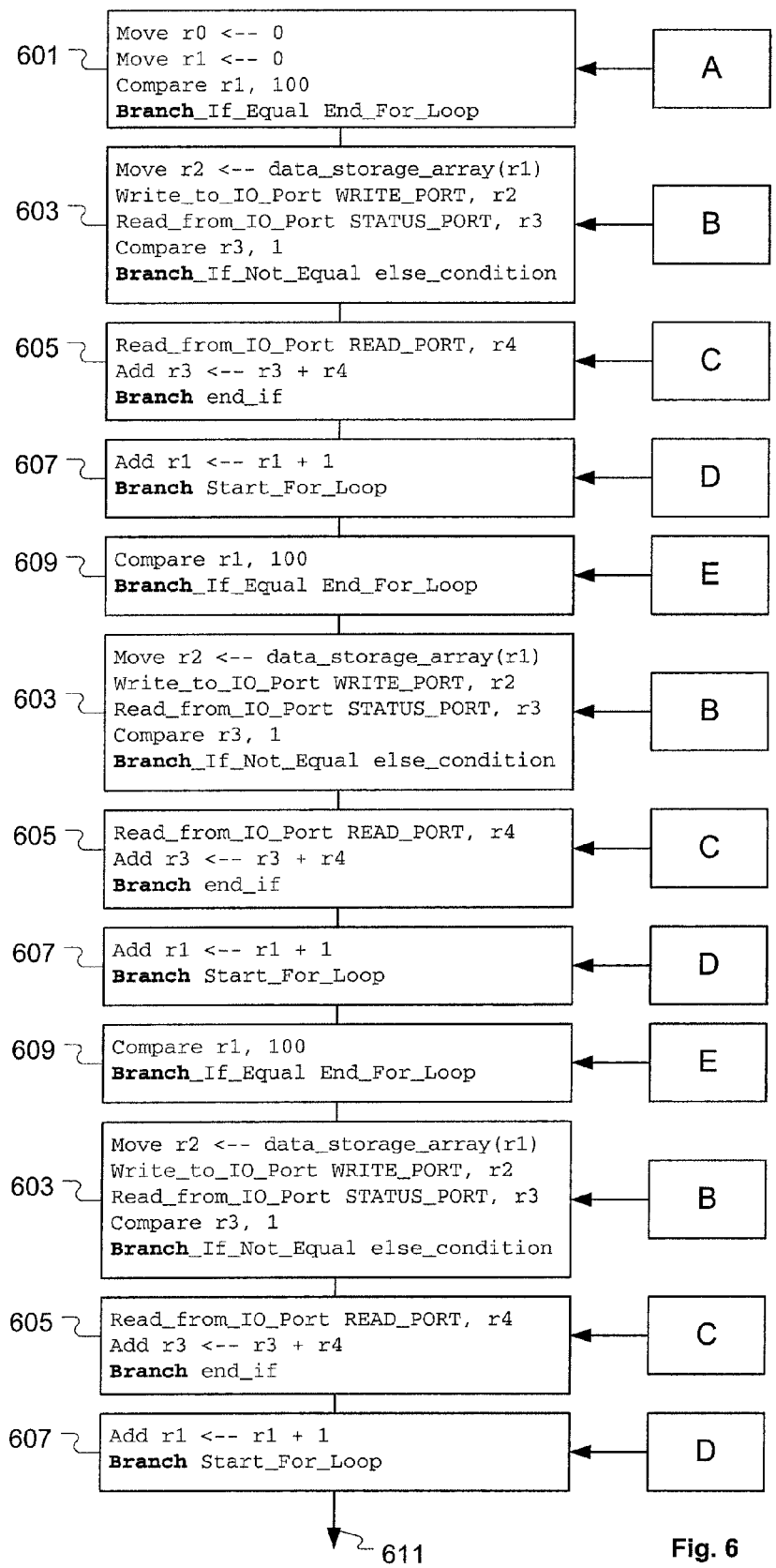
FIG. 6 is an illustration showing a segmentation of the instruction trace of FIG. 4A.

FIG. 6 is an illustration showing a segmentation of the instruction trace of FIG. 4A, in accordance with operation 501. Each boundary between adjacent instruction segments (601, 603, 605, 607, 609) is defined by a branch instruction. In the segmented instruction trace of FIG. 6, after the first four instruction segments (601, 603, 605, 607), the following sequence of four instruction segments (609, 603, 605, 607) is repeated 99 times. For ease of illustration, the repetition of the four instruction segments (609, 603, 605, 607) is represented by arrow 611 in FIG. 6.

From the operation 501, the method of FIG. 5A proceeds with an operation 503 for assigning a segment identifier to each instruction segment. In the example of FIG. 6, segment identifiers A, B, C, D, E are assigned to instruction segments 601, 603, 605, 607, 609, respectively. The segment identifiers are assigned to the instruction segments such that each instruction segment having identical content is assigned a same segment identifier. Also, the segment identifiers are assigned to the instruction segments such that each instruction segment having different content is assigned a different segment identifier. Thus, each unique instruction segment is assigned a unique segment identifier, and each identical instruction segment is assigned the same segment identifier. Although alphabetic segment identifiers are used in the present exemplary embodiment, it should be appreciated that other types of segment identifiers, e.g., symbols, numbers, alphanumeric identifiers, etc., can be used in other embodiments.

From the operation 503, the method of FIG. 5A proceeds with an operation 505 for translating the instruction trace into a sequence of segment identifiers. The translating of operation 505 is effectively performed by substituting the assigned segment identifiers from operation 503 for the corresponding instruction segments within the instruction trace. Thus, to translate the instruction trace of FIG. 4A into a sequence of segment identifiers, the segment identifiers A, B, C, D, and E assigned as shown in FIG. 6 are substituted for their respective instruction segments in the instruction trace of FIG. 4A. FIG. 7A is an illustration showing an original sequence of segment identifiers 701A resulting from translation of the instruction trace of FIG. 4A.

From the operation 505, the method proceeds with an operation 507 for iteratively consolidating the original sequence of identifiers into a prime form. The prime form of the original sequence of identifiers does not include a repetition of a heterogeneous pair of consecutive segment identifiers. The heterogeneous pair of consecutive segment identifiers corresponds to two different segment identifiers that occur consecutively within the sequence of segment identifiers. For example, in a sequence of segment identifiers represented as "ABCD," each of "AB," "BC," and "CD" represent a heterogeneous pair of consecutive segment identifiers. Before continuing with the discussion of the method of FIG. 5A, it is beneficial to discuss the operation 507 in more detail.

Figure 5B:
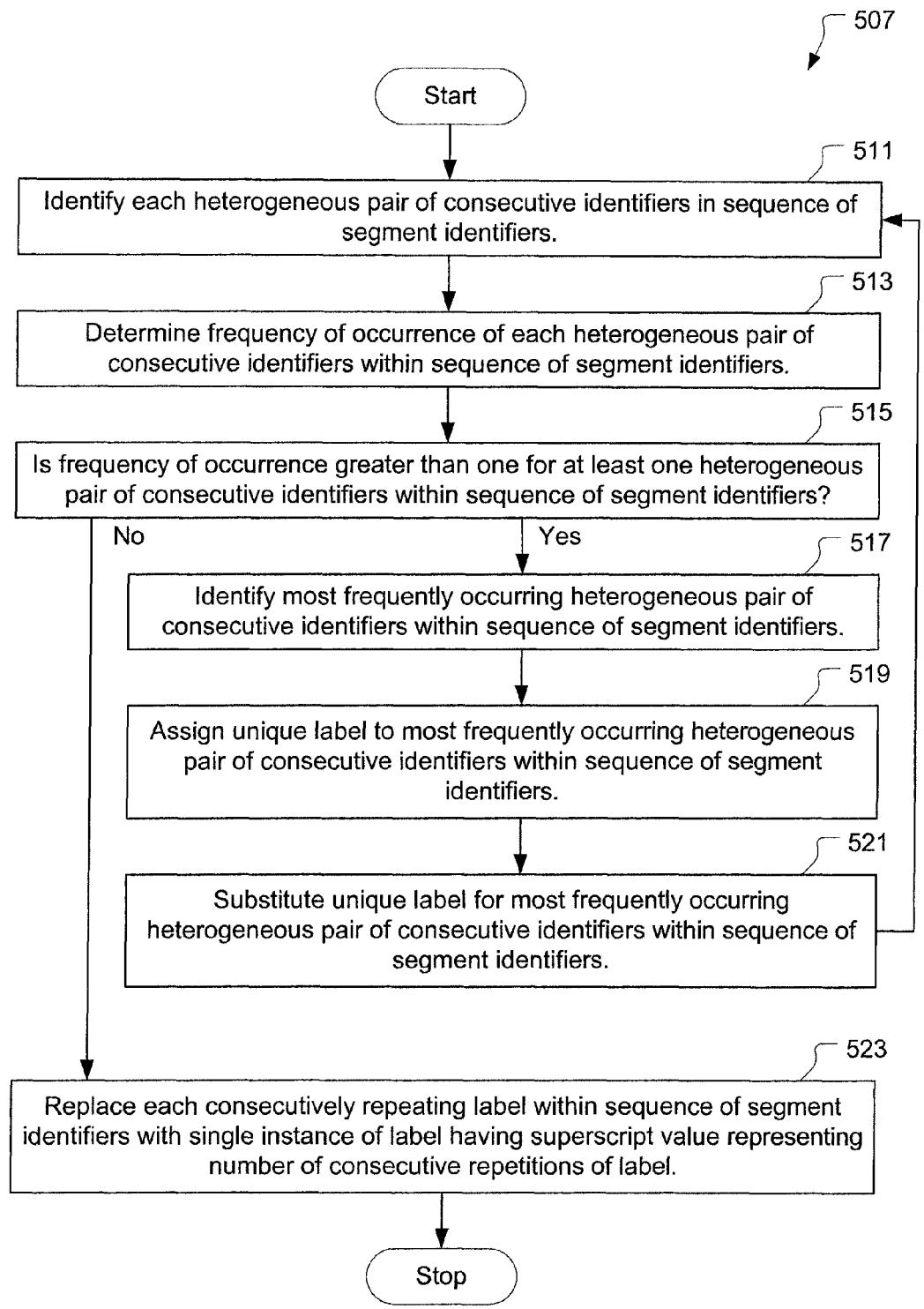
FIG. 5B is an illustration showing a flowchart of a method for iteratively consolidating a sequence of identifiers into a prime form, in accordance with one embodiment of the present invention.

FIG. 5B is an illustration showing a flowchart of a method for iteratively consolidating a sequence of identifiers into a prime form, as performed in operation 507, in accordance with one embodiment of the present invention. The method of FIG. 5B begins with an operation 511 for identifying each heterogeneous pair of consecutive identifiers within the sequence of segment identifiers. An operation 513 is then performed to determine a frequency of occurrence of each identified heterogeneous pair of consecutive identifiers within the sequence of segment identifiers. A decision operation is then performed to determine whether or not at least one of the identified heterogeneous pairs of consecutive identifiers has a frequency of occurrence that is greater than one. If at least one of the identified heterogeneous pairs of consecutive identifiers has a frequency of occurrence that is greater than one, the method proceeds with an operation 517. Otherwise, the method proceeds with an operation 523.

In the operation 517, identification is made of a most frequently occurring heterogeneous pair of consecutive identifiers within the sequence of segment identifiers. With reference to the sequence of segment identifiers 701A in FIG. 7A, operation 517 identifies "BC" as the heterogeneous pair of consecutive segment identifiers that occurs most frequently. An operation 519 is performed to assign a unique label to the most frequently occurring heterogeneous pair of consecutive segment identifiers as identified in operation 517. An operation 521 is then performed to substitute the unique label for the most frequently occurring heterogeneous pair of consecutive segment identifiers within the sequence of segment identifiers.

FIG. 7B is an illustration showing the sequence of segment identifiers 701A having operations 517 through 521 performed thereon to produce a modified sequence of segment identifiers 701B. In FIG. 7B, most frequently occurring heterogeneous pair of consecutive segment identifiers "BC" in the sequence of segment identifiers 701A is assigned the unique label "X." The unique label "X" is substituted for "BC" in the sequence of segment identifiers 701A to generate the modified sequence of segment identifiers 701B. From operation 521, the method of FIG. 5B reverts back to operation 511. It should be understood that in each subsequent pass through operations 511 through 523, the term "sequence of segment identifiers" corresponds to a sequence of segment identifiers and labels (as substituted in operation 521). However, for ease of description, the term "sequence of segment identifiers" is simply used to represent the sequence of segment identifiers and labels.

FIG. 7C is an illustration showing the modified sequence of segment identifiers 701B having operations 517 through 521 performed thereon to produce a modified sequence of segment identifiers 701C. In FIG. 7C, the most frequently occurring heterogeneous pair of consecutive segment identifiers "XD" in the sequence of segment identifiers 701B is assigned the unique label "Y." The unique label "Y" is substituted for "XD" in the sequence of segment identifiers 701B to generate the modified sequence of segment identifiers 701C.

FIG. 7D is an illustration showing the modified sequence of segment identifiers 701C having operations 517 through 521 performed thereon to produce a modified sequence of segment identifiers 701D. In FIG. 7D, the most frequently occurring heterogeneous pair of consecutive segment identifiers "EY" in the sequence of segment identifiers 701C is assigned the unique label "Z." The unique label "Z" is substituted for "EY" in the sequence of segment identifiers 701C to generate the modified sequence of segment identifiers 701D.

With regard to operation 515, if there is not at least one heterogeneous pair of consecutive segment identifiers that has a frequency of occurrence greater than one, the method proceeds with operation 523. In the operation 523, each consecutively repeating label within the sequence of segment identifiers (as modified by the pass(es) through operations 517-521) is replaced with a single instance of the label having a superscript value representing a number of consecutive repetitions of the label. FIG. 7E is an illustration showing the sequence of segment identifiers 701D having operation 523 performed thereon to produce a modified sequence of segment identifiers 701E. In the modified sequence of segment identifiers 701D, the label "Z" consecutively repeats 99 times. Therefore, in the modified sequence of segment identifiers 701E, the 99 consecutive repetitions of "Z" is replaced by "$Z^{99}$." The modified sequence of segment identifiers 701E, i.e., $AYZ^{99}$, along with the label definitions, i.e., X=BC, Y=XD, Z=EY, represents the prime form of the original sequence of identifiers 701A. Thus, the modified sequence of segment identifiers 701E, i.e., $AYZ^{99}$, along with the label definitions, i.e., X=BC, Y=XD, Z=EY, represents the result of interactively consolidating the sequence of segment identifiers into a prime form. It should be appreciated that the prime form of the original sequence of identifiers does not include a repetition of a heterogeneous pair of consecutive segment identifiers.

The prime form of the original sequence of segment identifiers can be represented in a consolidated form by expanding a first occurrence of each unique label within the prime form with a definition of the unique label. FIG. 7F is an illustration showing the prime form of the original sequence of segment identifiers, as presented in FIG. 7E, represented in a consolidated form. As shown in FIG. 7F, the first occurrence of each label X, Y, and Z in the modified sequence of segment identifiers 701E is replaced by its definition, with parentheses used to delineate associations between labels and their respective definitions. It should be noted that because the first occurrence of the label Z appears at the end of the prime form, only the definition of Z, i.e., EY, is explicitly shown in the consolidated representation of the prime form. However, in an alternative consolidated representation the label Z followed by an equals sign could have been shown before its definition EY.

Referring back to the method of FIG. 5A, following the operation 507, the method proceeds with an operation 509 for rendering the prime form of the sequence of segment identifiers in a graphical format. In one embodiment, operation 509 includes depicting each of a number of elements within the prime form of the original sequence of segment identifiers as a geometric shape. Each element within the prime form can represent either a segment identifier or a label, wherein the label is defined to represent a combination of segment identifiers, a combination of a segment identifier and another label, or a combination of other labels. In this embodiment, operation 509 also includes depicting relationships between the geometric shapes so as to represent the relationships between the number of elements as they exist within the prime form of the original sequence of segment identifiers.

Figure 8:
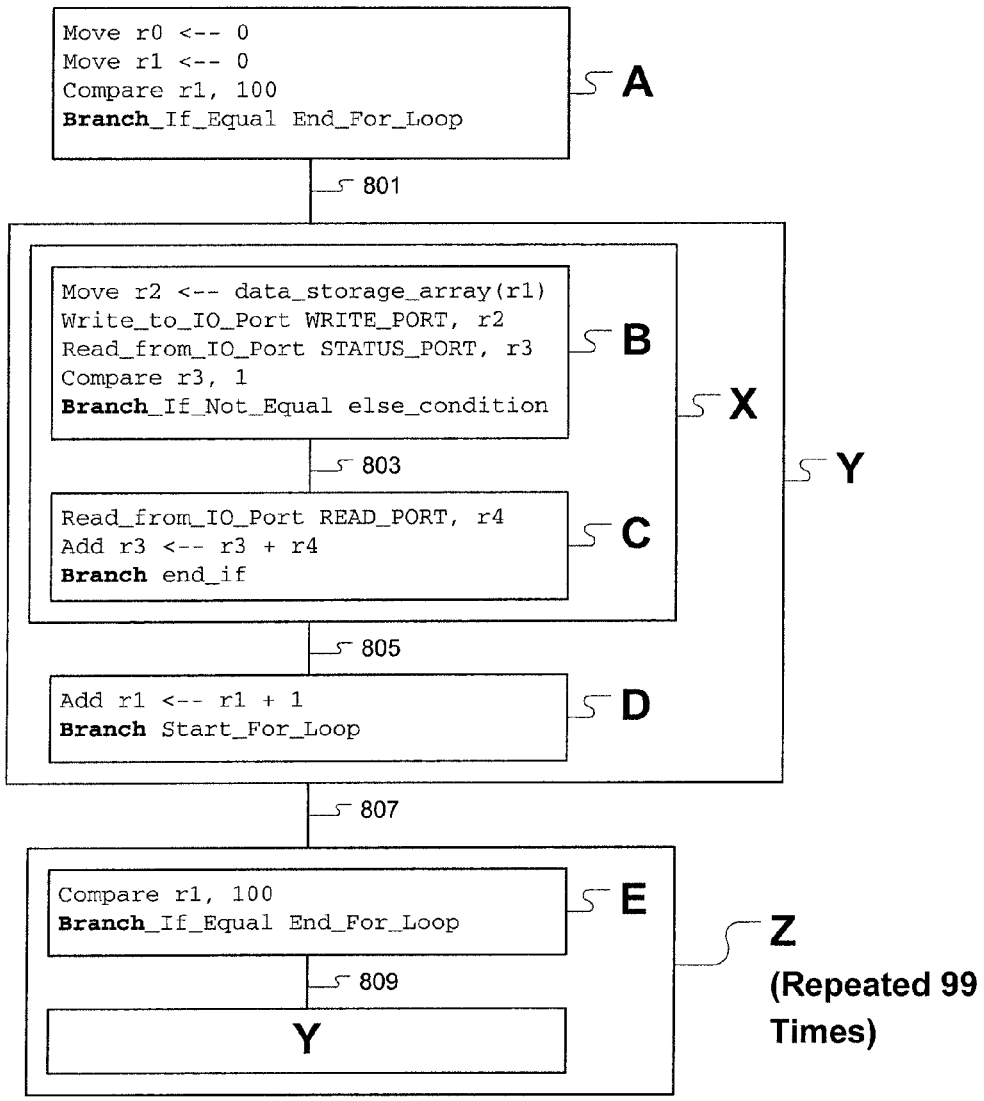
FIG. 8 is an illustration showing a graphical format rendering of the prime form of the original sequence of segment identifiers, in accordance with one embodiment of the present invention.

FIG. 8 is an illustration showing a graphical format rendering of the prime form of the original sequence of segment identifiers, as represented in FIG. 7F, in accordance with operation 509, and in further accordance with one embodiment of the present invention. For ease of discussion, the prime form of the original sequence of segment identifiers, as represented in FIG. 7F, will simply be referred to as the prime form. Each of the elements A, B, C, D, E, X, Y, and Z within the prime form is depicted as a rectangle in the graphical format of FIG. 8. Nesting of the rectangles in the graphical format indicates relationships between the elements within the prime form. More specifically, the rectangles are nested to mirror the parenthetical relationships between elements within the prime form. Lines 801-809 are used to depict sequential relationships between elements within the prime form. Additionally, each rectangle corresponding to a first instance of a segment identifier (A, B, C, D, and E) within the graphical format includes a listing of the instructions that define the instruction segment associated with the segment identifier. Furthermore, consecutive repetition of elements within the prime form is identified in the graphical format. For example, the label Z is identified as being repeated 99 times.

Figure 9A:
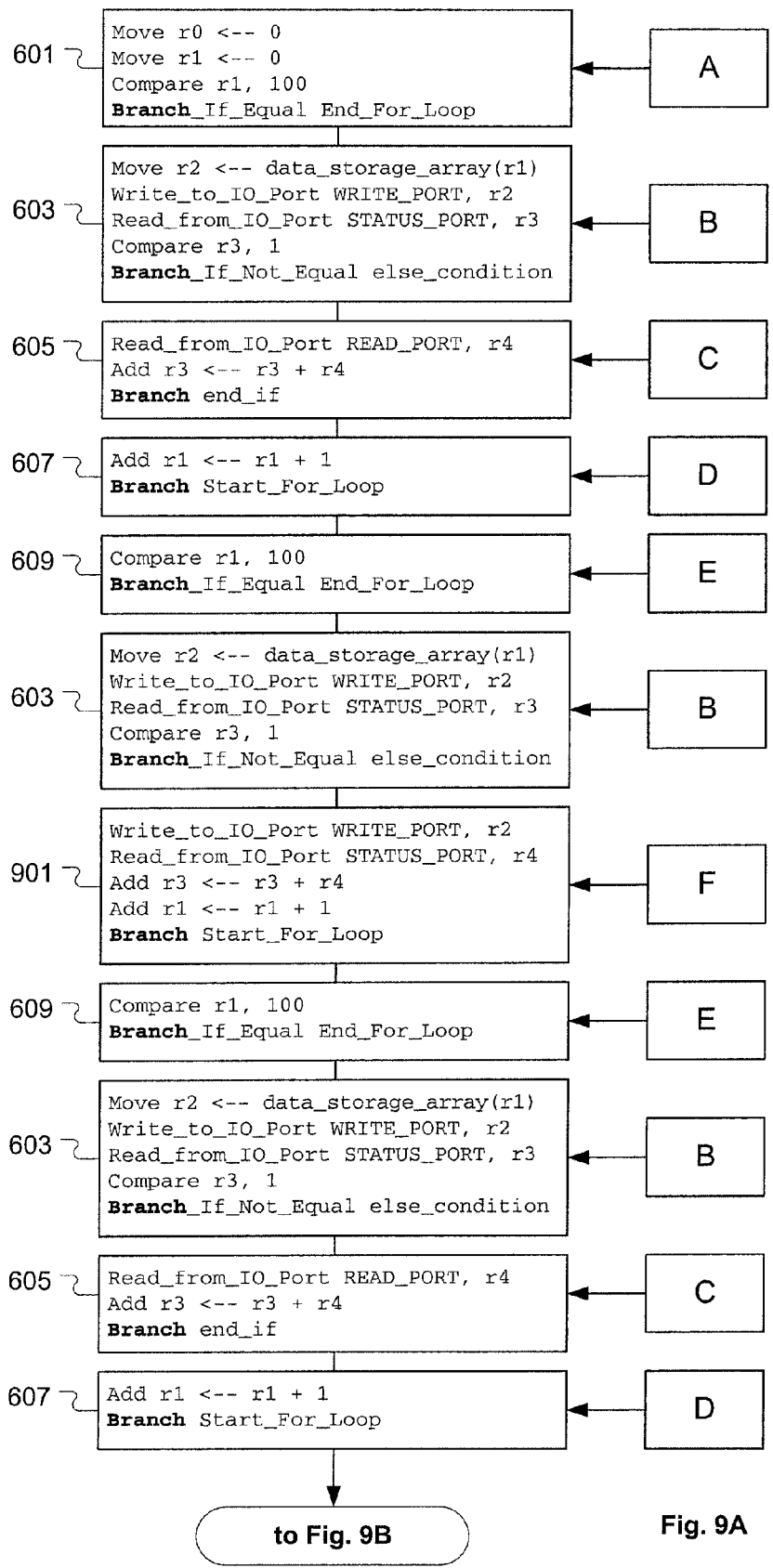
FIGS. 9A-9B are illustrations showing a segmentation of the instruction trace of FIG. 4B.
Figure 9B:
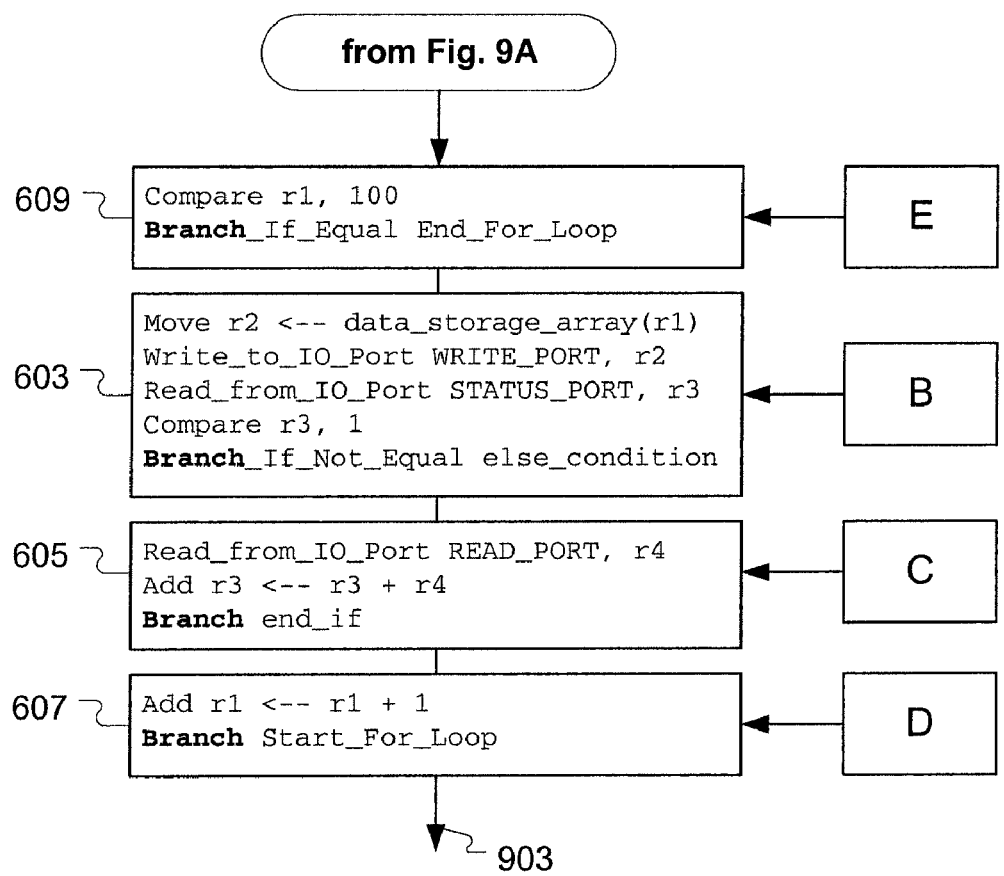

The method of FIG. 5A for decomposing an instruction trace is also applied to the instruction trace of FIG. 4B. FIGS. 9A-9B are illustrations showing a segmentation of the instruction trace of FIG. 4B, in accordance with operation 501. Each boundary between adjacent instruction segments (601, 603, 605, 607, 609, and 901) is defined by a branch instruction. In the segmented instruction trace of FIGS. 9A-9B, after the first seven instruction segments (601, 603, 605, 607, 609, 603, 901), the following sequence of four instruction segments (609, 603, 605, 607) is repeated 98 times. For ease of illustration, the repetition of the four instruction segments (609, 603, 605, 607) is represented by arrow 903 in FIG. 9B.

In accordance with operation 503, segment identifiers A, B, C, D, E, and F are assigned to instruction segments 601, 603, 605, 607, 609, and 901 respectively. The segment identifiers are assigned to the instruction segments such that each instruction segment having identical content is assigned a same segment identifier. Also, the segment identifiers are assigned to the instruction segments such that each instruction segment having different content is assigned a different segment identifier. Thus, each unique instruction segment is assigned a unique segment identifier, and each identical instruction segment is assigned the same segment identifier.

FIG. 10A is an illustration showing an original sequence of segment identifiers 1001A resulting from translation of the instruction trace of FIG. 4B into a sequence of segment identifiers, in accordance with operation 505. FIGS. 10B-10F show an iterative consolidation of the original sequence of segment identifiers 1001A into a prime form, in accordance with operation 507.

FIG. 10B is an illustration showing the sequence of segment identifiers 1001A having operations 517 through 521 of FIG. 5B performed thereon to produce a modified sequence of segment identifiers 1001B. In FIG. 10B, the most frequently occurring heterogeneous pair of consecutive segment identifiers "BC" in the sequence of segment identifiers 1001A is assigned the unique label "X." The unique label "X" is substituted for "BC" in the sequence of segment identifiers 1001A to generate the modified sequence of segment identifiers 1001B.

FIG. 10C is an illustration showing the modified sequence of segment identifiers 1001B having operations 517 through 521 of FIG. 5B performed thereon to produce a modified sequence of segment identifiers 1001C. In FIG. 10C, the most frequently occurring heterogeneous pair of consecutive segment identifiers "XD" in the sequence of segment identifiers 1001B is assigned the unique label "Y." The unique label "Y" is substituted for "XD" in the sequence of segment identifiers 1001B to generate the modified sequence of segment identifiers 1001C.

FIG. 10D is an illustration showing the modified sequence of segment identifiers 1001C having operations 517 through 521 of FIG. 5A performed thereon to produce a modified sequence of segment identifiers 1001D. In FIG. 10D, the most frequently occurring heterogeneous pair of consecutive segment identifiers "EY" in the sequence of segment identifiers 1001C is assigned the unique label "Z." The unique label "Z" is substituted for "EY" in the sequence of segment identifiers 1001C to generate the modified sequence of segment identifiers 1001D.

FIG. 10E is an illustration showing the sequence of segment identifiers 1001D having operation 523 performed thereon to produce a modified sequence of segment identifiers 1001E. In the modified sequence of segment identifiers 1001D, the label "Z" consecutively repeats 98 times. Therefore, in the modified sequence of segment identifiers 1001E, the 98 consecutive repetitions of "Z" is replaced by "$Z^{98}$." The modified sequence of segment identifiers 1001E, i.e., $AYEBFZ^{98}$, along with the label definitions, i.e., X=BC, Y=XD, Z=EY, represents the prime form of the original sequence of identifiers 1001A.

FIG. 10F is an illustration showing the prime form of the original sequence of segment identifiers, as presented in FIG. 10E, represented in a consolidated form. As shown in FIG. 10F, the first occurrence of each label X, Y, and Z in the modified sequence of segment identifiers 1001E is replaced by its definition, with parentheses used to delineate associations between labels and their respective definitions. It should be noted that because the first occurrence of the label Z appears at the end of the prime form, only the definition of Z, i.e., EY, is explicitly shown in the consolidated representation of the prime form. However, in an alternative consolidated representation the label Z followed by an equals sign could have been shown before its definition EY.

Figure 11:
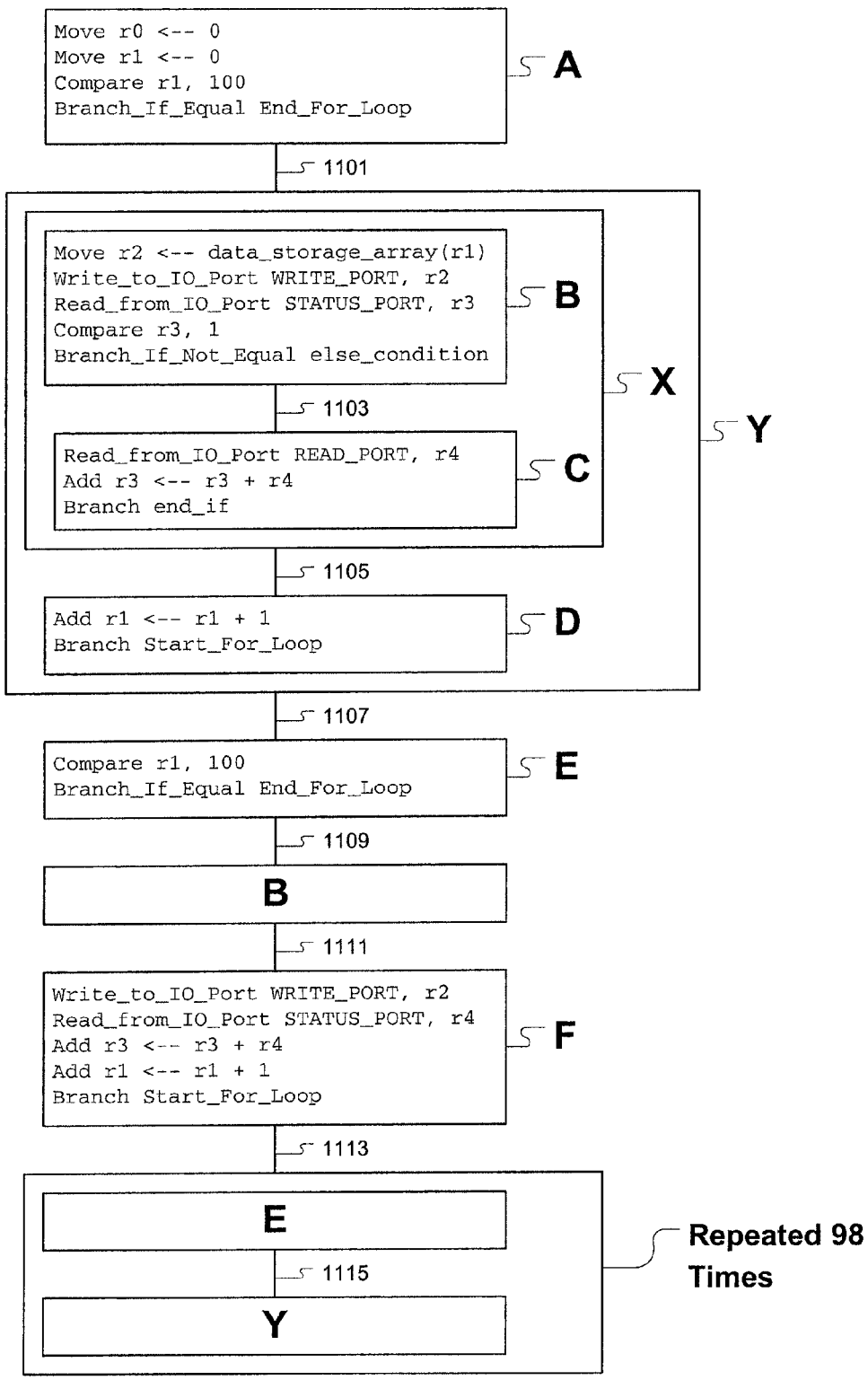
FIG. 11 is an illustration showing a graphical format rendering of the prime form of the original sequence of segment identifiers, in accordance with one embodiment of the present invention.

FIG. 11 is an illustration showing a graphical format rendering of the prime form of the original sequence of segment identifiers, as represented in FIG. 10F, in accordance with operation 509 of FIG. 5A. For ease of discussion, the prime form of the original sequence of segment identifiers, as represented in FIG. 10F, will simply be referred to as the prime form. Each of the elements A, B, C, D, E, F, X, Y, and Z within the prime form is depicted as a rectangle in the graphical format of FIG. 11. Nesting of the rectangles in the graphical format indicates relationships between the elements within the prime form. More specifically, the rectangles are nested to mirror the parenthetical relationships between elements within the prime form. Lines 1101-1115 are used to depict sequential relationships between elements within the prime form. Additionally, each rectangle corresponding to a first instance of a segment identifier (A, B, C, D, E, and F) within the graphical format includes a listing of the instructions that define the instruction segment associated with the segment identifier. Furthermore, consecutive repetition of elements within the prime form is identified in the graphical format. For example, the label Z is identified as being repeated 98 times.

A difference between the instruction traces of FIGS. 4A and 4B can be readily identified through visual examination of the respective decomposed instruction traces as shown in FIGS. 8 and 11, respectively. Using the decomposed instruction trace of FIG. 8 as a correct baseline, it can be seen that the decomposed instruction trace of FIG. 11 includes a series of segment identifiers E, B, and F in place of first instance of the label Z. Therefore, through comparison of the decomposed instruction traces of FIGS. 8 and 11, the application developer is able to readily identify a difference between the extensive instruction traces of FIGS. 4A and 4B. The developer can then focus the debugging effort on the portion of the application that could be responsible for introduction of the extra instructions associated with the segment identifiers E, B, and F, as manifested in FIG. 11. It should be appreciated that the method for decomposing an instruction trace as described with regard to FIGS. 5A and 5B, enables an application developer to identify key differences between execution of a given portion of application code at different states and at real-time speeds.

Figure 12:
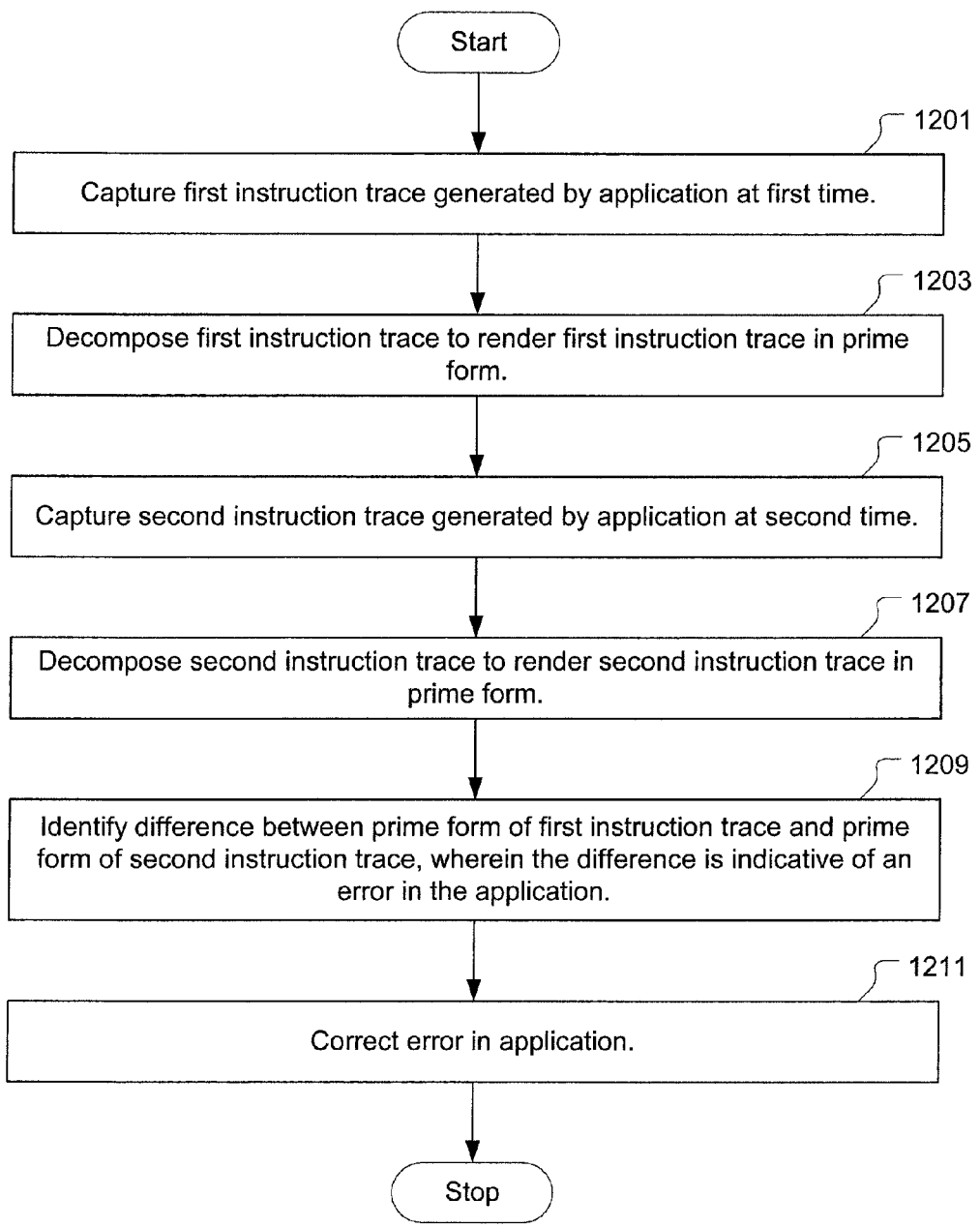
FIG. 12 is an illustration showing a flowchart of a method for debugging an application executing on an embedded device, in accordance with one embodiment of the present invention.

FIG. 12 is an illustration showing a flowchart of a method for debugging an application executing on an embedded device, in accordance with one embodiment of the present invention. The method includes an operation 1201 for capturing a first instruction trace generated by the application at a first time. The first instruction trace extends between a first breakpoint and a second breakpoint. Also, the first instruction trace represents a correct performance of the application between the first and second breakpoints. The method also includes an operation 1203 for decomposing the first instruction trace to render the first instruction trace in a prime form defined by a consolidated sequence of instruction segment identifiers. Decomposition of the first instruction trace is performed in accordance with the methods of FIGS. 5A and 5B, as previously described.

The method of FIG. 12 also includes an operation 1205 for capturing a second instruction trace generated by the application at a second time. Like the first instruction trace, the second instruction trace extends between the first and second breakpoints. The second instruction trace represents an incorrect performance of the application between the first and second breakpoints. In an operation 1207, the second instruction trace is decomposed to render the second instruction trace in a prime form defined by a consolidated sequence of instruction segment identifiers. Decomposition of the second instruction trace is performed in accordance with the methods of FIGS. 5A and 5B, as previously described.

The method of FIG. 12 continues with an operation 1209 for identifying a difference between the prime form of the first instruction trace and the prime form of the second instruction trace. The identified difference is indicative of an error in the application. Then, an operation 1211 is performed to correct the error in the application corresponding to the identified difference between the prime form of the first instruction trace and the prime form of the second instruction trace. To facilitate identification of the difference between the prime forms of the first and second instruction traces in operation 1209, the method of FIG. 12 can include an operation for rendering each of the prime form of the first instruction trace and the prime form the second instruction trace in a graphical format, as exemplified in FIGS. 8 and 11.

The method for instruction trace decomposition as disclosed herein may be implemented in conjunction with a data processing system that includes one or more of the following components: a processor; memory, I/O circuitry, and peripheral devices. The data processing system can be used in a wide variety of applications, such as computer networking, data networking, instrumentation, video processing, digital signal processing, or any other suitable application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

Additionally, the method for instruction trace decomposition can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network of coupled computer systems so that the computer readable code is stored and executed in a distributed fashion.

While this invention has been described in terms of several embodiments, it will be appreciated that those skilled in the art upon reading the preceding specifications and studying the drawings will realize various alterations, additions, permutations and equivalents thereof. Therefore, it is intended that the present invention includes all such alterations, additions, permutations, and equivalents as fall within the true spirit and scope of the invention.

What is claimed is:

1. A method for decomposing an instruction trace, comprising:
   segmenting an instruction trace into a number of contiguous instruction segments such that each boundary between adjacent instruction segments is defined by a branch instruction;
   assigning a segment identifier to each instruction segment, wherein each instruction segment having identical content is assigned a same segment identifier, and wherein each instruction segment having different content is assigned a different segment identifier;
   translating the instruction trace into a sequence of segment identifiers;
   iteratively consolidating the sequence of segment identifiers into a prime form, wherein the prime form of the sequence of segment identifiers does not include a repetition of a heterogeneous pair of consecutive segment identifiers, the heterogeneous pair of consecutive segment identifiers corresponds to two different segment identifiers that occur consecutively within the sequence of segment identifiers; and
   rendering the prime form of the sequence of segment identifiers in a graphical format.

2. A method for decomposing an instruction trace as recited in claim 1, wherein the instruction trace is generated by an application executing on an embedded device, the instruction trace extending between a first breakpoint and a second breakpoint.

3. A method for decomposing an instruction trace as recited in claim 1, wherein the translating is performed by substituting the assigned segment identifiers for the corresponding instruction segments within the instruction trace.

4. A method for decomposing an instruction trace as recited in claim 1, wherein iteratively consolidating the sequence of segment identifiers into the prime form includes,
   (a) identifying each heterogeneous pair of consecutive identifiers within the sequence of segment identifiers,
   (b) determining a frequency of occurrence of each identified heterogeneous pair of consecutive identifiers within the sequence of segment identifiers,
   (c) if the frequency of occurrence is greater than one for at least one of the identified heterogeneous pairs of consecutive identifiers within the sequence of segment identifiers,
      (c1) identifying a most frequently occurring heterogeneous pair of consecutive identifiers within the sequence of segment identifiers,
      (c2) assigning a unique label to the most frequently occurring heterogeneous pair of consecutive identifiers within the sequence of segment identifiers, (c3) substituting the unique label for the most frequently occurring heterogeneous pair of consecutive identifiers within the sequence of segment identifiers, (c4) repeat operations (a) through (c), (d) if the frequency of occurrence is not greater than one for at least one of the identified heterogeneous pairs of consecutive identifiers within the sequence of segment identifiers, replacing each consecutively repeating label within the sequence of segment identifiers with a single instance of the repeating label having a superscript value representing a number of consecutive repetitions of the repeating label.

5. A method for decomposing an instruction trace as recited in claim 4, further comprising:

expanding a first occurrence of each unique label within the prime form with a definition of the unique label.

6. A method for decomposing an instruction trace as recited in claim 1, wherein rendering the prime form of the sequence of segment identifiers in a graphical format includes, depicting each of a number of elements within the prime form of the sequence of segment identifiers as a geometric shape, and depicting relationships between the geometric shapes so as to represent relationships between the number of elements within the prime form of the sequence of segment identifiers, wherein each element represents either a segment identifier or a label defined to represent a combination of segment identifiers.

7. A method for debugging an application executing on an embedded device, comprising:

capturing a first instruction trace generated by the application at a first time, wherein the first instruction trace extends between a first breakpoint and a second breakpoint, the first instruction trace representing a correct performance of the application between the first and second breakpoints;

decomposing the first instruction trace to render the first instruction trace in a prime form defined by a consolidated sequence of instruction segment identifiers that does not include a repetition of a heterogeneous pair of consecutive instruction segment identifiers, the heterogeneous pair of consecutive instruction segment identifiers corresponds to two different instruction segment identifiers that occur consecutively within the consolidated sequence of instruction segment identifiers;

capturing a second instruction trace generated by the application at a second time, wherein the second instruction trace extends between the first and second breakpoints, the second instruction trace representing an incorrect performance of the application between the first and second breakpoints;

decomposing the second instruction trace to render the second instruction trace in a prime form defined by a consolidated sequence of instruction segment identifiers that does not include a repetition of a heterogeneous pair of consecutive instruction segment identifiers;

identifying a difference between the prime form of the first instruction trace and the prime form of the second instruction trace, wherein the difference is indicative of an error in the application; and correcting the error in the application.

8. A method for debugging an application executing on an embedded device as recited in claim 7, wherein decomposing each of the first and second instruction traces respectively includes, segmenting the instruction trace into a number of contiguous instruction segments such that each boundary between adjacent instruction segments is defined by a branch instruction;

assigning a segment identifier to each instruction segment, wherein each instruction segment having identical content is assigned a same segment identifier;

translating the instruction trace into a sequence of segment identifiers; and iteratively consolidating the sequence of segment identifiers into the prime form.

9. A method for debugging an application executing on an embedded device as recited in claim 8, wherein each instruction segment having different content is assigned a different segment identifier.

10. A method for debugging an application executing on an embedded device as recited in claim 8, wherein the translating is performed by substituting the assigned segment identifiers for the corresponding instruction segments within the instruction trace.

11. A method for debugging an application executing on an embedded device as recited in claim 8, wherein iteratively consolidating the sequence of segment identifiers into the prime form includes, (a) identifying each heterogeneous pair of consecutive identifiers within the sequence of segment identifiers, (b) determining a frequency of occurrence of each identified heterogeneous pair of consecutive identifiers within the sequence of segment identifiers, (c) if the frequency of occurrence is greater than one for at least one of the identified heterogeneous pairs of consecutive identifiers within the sequence of segment identifiers, (c1) identifying a most frequently occurring heterogeneous pair of consecutive identifiers within the sequence of segment identifiers, (c2) assigning a unique label to the most frequently occurring heterogeneous pair of consecutive identifiers within the sequence of segment identifiers, (c3) substituting the unique label for the most frequently occurring heterogeneous pair of consecutive identifiers within the sequence of segment identifiers, (c4) repeat operations (a) through (c), (d) if the frequency of occurrence is not greater than one for at least one of the identified heterogeneous pairs of consecutive identifiers within the sequence of segment identifiers, replacing each consecutively repeating label within the sequence of segment identifiers with a single instance of the repeating label having a superscript value representing a number of consecutive repetitions of the repeating label.

12. A method for debugging an application executing on an embedded device as recited in claim 11, further comprising:

expanding a first occurrence of each unique label within the prime form with a definition of the unique label.

13. A method for debugging an application executing on an embedded device as recited in claim 7, further comprising:

rendering each of the prime form of the first instruction trace and the prime form the second instruction trace in a graphical format to facilitate identifying the difference between the prime form of the first instruction trace and the prime form of the second instruction trace.

14. A method for debugging an application executing on an embedded device as recited in claim 13, wherein rendering each of the prime form of the first instruction trace and the prime form the second instruction trace in a graphical format respectively includes, depicting each of a number of elements within the prime form of the instruction trace as a geometric shape, and depicting relationships between the geometric shapes so as to represent relationships between the number of elements within the prime form of the instruction trace, wherein each element represents either an instruction segment identifier or a label defined to represent a combination of instruction segment identifiers.

15. A data storage device for storing data to be read by a computer system having program instructions stored thereon for decomposing an instruction trace, comprising:

program instructions for segmenting an instruction trace into a number of contiguous instruction segments such that each boundary between adjacent instruction segments is defined by a branch instruction;

program instructions for assigning a segment identifier to each instruction segment, wherein each instruction segment having identical content is assigned a same segment identifier, and wherein each instruction segment having different content is assigned a different segment identifier;

program instructions for translating the instruction trace into a sequence of segment identifiers;

program instructions for iteratively consolidating the sequence of segment identifiers into a prime form, wherein the prime form of the sequence of segment identifiers does not include a repetition of a heterogeneous pair of consecutive segment identifiers, the heterogeneous pair of consecutive segment identifiers corresponds to two different segment identifiers that occur consecutively within the sequence of segment identifiers; and program instructions for rendering the prime form of the sequence of segment identifiers in a graphical format.

16. A data storage device for storing data to be read by a computer system having program instructions stored thereon for decomposing an instruction trace as recited in claim 15, wherein the instruction trace is generated by an application executing on an embedded device, the instruction trace extending between a first breakpoint and a second breakpoint.

* * * * *